United States Patent
Saleh et al.

(10) Patent No.: US 11,858,815 B2
(45) Date of Patent: Jan. 2, 2024

(54) GRAPHENE MODIFIED WITH LINEAR ALKYLAMINES FOR OIL REMOVAL FROM PRODUCED WATER

(71) Applicants: SAUDI ARABIAN OIL COMPANY, Dhahran (SA); KING FAHD UNIVERSITY OF PETROLEUM & MINERALS, Dhahran (SA)

(72) Inventors: Tawfik A. Saleh, Dhahran (SA); Fahd Ibrahim Alghunaimi, Dhahran (SA); Norah W. Aljuryyed, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 48 days.

(21) Appl. No.: 17/490,853

(22) Filed: Sep. 30, 2021

(65) Prior Publication Data
US 2023/0108377 A1   Apr. 6, 2023

(51) Int. Cl.
*C01B 32/194* (2017.01)
*C02F 1/28* (2023.01)
(Continued)

(52) U.S. Cl.
CPC ............ *C01B 32/194* (2017.08); *C02F 1/001* (2013.01); *C02F 1/285* (2013.01); *B82Y 40/00* (2013.01);
(Continued)

(58) Field of Classification Search
CPC ............................. C01B 32/182; C01B 32/194
See application file for complete search history.

(56) References Cited

U.S. PATENT DOCUMENTS

2010/0096597 A1   4/2010   Prud'Homme et al.
2012/0129736 A1   5/2012   Tour et al.
(Continued)

FOREIGN PATENT DOCUMENTS

CN   104771936 A   7/2015
CN   105968254 A   9/2016
(Continued)

OTHER PUBLICATIONS

Abdullahi, B. O., et al. "Facile fabrication of hydrophobic alkylamine intercalated graphene oxide as absorbent for highly effective oil-water separation." Journal of Molecular Liquids 325 (2021): 115057.*
(Continued)

*Primary Examiner* — Richard M Rump
(74) *Attorney, Agent, or Firm* — Osha Bergman Watanabe & Burton LLP

(57) ABSTRACT

Provided is a composition that may include an alkylamine modified graphene having a formula R[—$CH_2$-alkylamine)]$_x$, where R is a graphene core, [—$CH_2$-alkylamine)] is an alkylamine functional group, and x is a non-zero integer. The alkylamine functional group may include [—$CH_2$-n-propylamine)], [—$CH_2$-n-hexylamine)], or [—$CH_2$-n-dodecylamine)]. Trace amounts of an oxygen and nitrogen functional group may be coupled to the graphene core. Further provided is a method that may include introducing alkylamine modified graphene into a hydrocarbon-contaminated water. The method may further include separating a hydrocarbon-absorbed alkylamine modified graphene from the recovered water. Further provided is a system that may include a holding tank, a pump, a membrane housing, and a collection tank. The membrane housing may include membranes and a filtration media.

10 Claims, 5 Drawing Sheets

(51) Int. Cl.
   *C02F 1/00*     (2023.01)
   *B82Y 40/00*    (2011.01)
   *C02F 101/32*   (2006.01)
   *C02F 103/36*   (2006.01)

(52) U.S. Cl.
   CPC ...... *C01P 2004/24* (2013.01); *C01P 2004/64* (2013.01); *C02F 2101/32* (2013.01); *C02F 2103/365* (2013.01); *C02F 2305/08* (2013.01)

(56) References Cited

U.S. PATENT DOCUMENTS

| | | | |
|---|---|---|---|
| 2012/0245058 | A1 | 9/2012 | Monteiro et al. |
| 2012/0289613 | A1 | 11/2012 | Huang |
| 2015/0344769 | A1 | 12/2015 | Suresh et al. |
| 2019/0016943 | A1 | 1/2019 | Ren et al. |
| 2019/0048251 | A1 | 2/2019 | Agrawal et al. |
| 2020/0231445 | A1 | 7/2020 | Ren et al. |
| 2020/0377675 | A1 | 12/2020 | Ren et al. |

FOREIGN PATENT DOCUMENTS

| | | |
|---|---|---|
| CN | 107876033 A | 4/2018 |
| CN | 106006618 B | 6/2018 |
| CN | 110860273 A | 3/2020 |

OTHER PUBLICATIONS

Dehghanzad, Behzad, et al. "Synthesis and characterization of graphene and functionalized graphene via chemical and thermal treatment methods." RSC advances 6.5 (2016): 3578-3585.*

Shanmugharaj, A. M., et al. "Synthesis, characterization, and surface wettability properties of amine functionalized graphene oxide films with varying amine chain lengths." Journal of colloid and interface science 401 (2013): 148-154.*

Karim, Mohammad Razaul, Mohammed M. Rahman, and Abdullah M. Asiri. "Bifunctional electron conductive solid electrolyte and dye degrading photocatalyst from rGO-aminoalkane non-metallic origin." Journal of the Taiwan Institute of Chemical Engineers 112 (2020): 87-96.*

Ortiz, S. Nathalia Contreras, et al., "Crude oil/water emulsion separation using graphene oxide and amine-modified graphene oxide particles", Fuel 240, pp. 162-168, 2019 (7 pages).

Liu, Juan, et al., "Demulsification of Crude Oil-in-Water Emulsions Driven by Graphene Oxide Nanosheets", energy&fuels, pp. 1-39, 2015 (40 pages).

Shanmugharaj, A.M., et al., "Synthesis, characterization, and surface wettability properties of amine functionalized graphene oxide films with varying amine chain lengths", Journal of Colloid and Interface Science, vol. 401, pp. 148-154, 2013 (7 sheets).

Jang, Jinhee, et al., "Dispersibility of reduced alkylamine-functionalized graphene oxides in organic solvents", Journal of Colloid and Interface Science, vol. 424, pp. 62-66, 2014 (5 pages).

* cited by examiner

GRAPHENE MODIFIED WITH LINEAR ALKYLAMINES FOR OIL REMOVAL FROM PRODUCED WATER

BACKGROUND

Oil and water separation in water treatment and wastewater reuse is not limited to the oil and gas industry. In many industries, operating parameters and regulations emphasize reducing oil content to a minimum quantity. Oil content may include oil, organic toxins, and total organic carbon counts, among others.

In the oil and gas industry, reducing oil content by oil and water separation allows improved quality of water, recovery of oil, reusability of water, protection of downstream facilities, compliance with environmental regulations, and ability to meet flooding fluid specifications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the disclosure relates to a composition that may include an alkylamine modified graphene that has a formula $R[—CH_2\text{-(alkylamine)}]_x$, where R is a graphene core, $[—CH_2\text{-(alkylamine)}]$ is an alkylamine functional group, and x is a non-zero integer. The alkylamine functional group may be one or more selected from the group consisting of $[—CH_2\text{-(n-propylamine)}]$, $[—CH_2\text{-(n-hexylamine)}]$, and $[—CH_2\text{-(n-dodecylamine)}]$. Both trace amounts of an oxygen functional group and trace amounts of a nitrogen functional group may be coupled to the graphene core.

In another aspect, the disclosure relates to a method to use alkylamine modified graphene, that may include introducing the alkylamine modified graphene into a hydrocarbon-contaminated water such that a hydrocarbon-absorbed alkylamine modified graphene and a recovered water form. The hydrocarbon-contaminated water may include water and a hydrocarbon. The alkylamine modified graphene may have a formula $R[—CH_2\text{-(alkylamine)}]_x$, here R is a graphene core, $[—CH_2\text{-(alkylamine)}]$ is an alkylamine functional group, and x is a non-zero integer. Further, the alkylamine functional group may be one or more selected from the group consisting of $[—CH_2\text{-(n-propylamine)}]$, $[—CH_2\text{-(n-hexylamine)}]$, and $[—CH_2\text{-(n-dodecylamine)}]$. The method may further include separating the hydrocarbon-absorbed alkylamine modified graphene from the recovered water. The hydrocarbon may be associated with the hydrocarbon-absorbed alkylamine modified graphene.

In yet another aspect, the disclosure relates to a system that may include a holding tank configured to contain fluid. The system may include a pump coupled to and downstream of the holding tank. The system may include a membrane housing coupled to and downstream of the pump. The membrane housing may include two or more membranes and a filtration media between the two or more membranes. The filtration media may include an alkylamine modified graphene having a formula $R[—CH_2\text{-(alkylamine)}]_x$, where R is a graphene core, $[—CH_2\text{-(alkylamine)}]$ is an alkylamine functional group, and x is a non-zero integer. The alkylamine functional group may be one or more selected from the group consisting of $[—CH_2\text{-(n-propylamine)}]$, $[—CH_2\text{-(n-hexylamine)}]$, and $[—CH_2\text{-(n-dodecylamine)}]$. The system may further include a collection tank coupled to and downstream of the membrane housing.

Other aspects and advantages of the claimed subject matter will be apparent from the following description and the appended claims.

DETAILED DESCRIPTION

Figure 1:
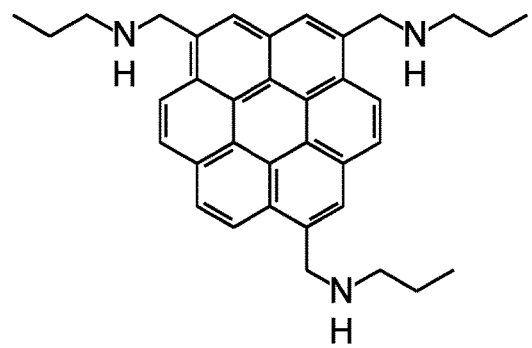
FIG. 1 shows a representation of a graphene modified with n-propylamine (GPA), according to one or more embodiments.

One or more embodiments relate to a synthetic absorbent material for hydrocarbon and water separation. The synthetic absorbent material is an alkylamine modified graphene that removes hydrocarbon, such as oil, from a hydrocarbon and water mixture, to be described.

The composition and methods of use may be used for produced water in the oil and gas industry; chemical separation; environmental cleanup, like oil spills; produced water treatment; and general water purification.

One or more embodiments relates to a composition of matter, including modified graphene derivatives functionalized with linear alkylamines. These molecules may also be called alkylamine modified graphene.

The alkylamine modified graphene molecules efficiently absorb hydrocarbon, such as from a mixture of hydrocarbon and water, compared to graphene molecules that are not modified with alkylamine. The separation efficiency of hydrocarbon from water is due in part from the alkylamine functional groups (alkylamine chains on graphene) that allow said separation. These alkylamine functional groups on graphene are hydrophobic by nature and have affinity toward non-polar solvents and molecules. Since water is hydrophilic, the alkylamine modified graphene does not absorb water.

The alkylamine modified graphene molecules withstand use in treated water. The molecules may withstand processing conditions such as batch reaction, single-pass, and recycle-pass processes. The type of water may be salt water, acidic oil and water, or other suitable treated water.

One or more embodiments relates to a system for mechanical filtration using filtration media that is useful for removal of hydrocarbons from a combination of hydrocarbons and water. The alkylamine modified graphene is useful as a filtration medium for hydrocarbon-contaminated water.

The system includes a pump, tubing, filtration device packed with filtration media, and one or more collection tanks.

One or more embodiments relates to a method for removal of hydrocarbons from water. The method may include introducing water contaminated with oil, hydrocarbon, non-polar solvents, or mixtures thereof ("hydrocarbon-contaminated water") into one or more alkylamine modified graphene.

The oil, hydrocarbon, non-polar solvents, and mixtures thereof may be referred to as oil or hydrocarbon throughout and may also include organic material that is typically present in the organic media to be separated. As a non-limiting example, hydrocarbon-contaminated water from an oil well may include hydrocarbons including, but not limited to paraffins, naphthenes, aromatics, tars, maltenes, and asphaltenes.

Conventional compositions and methods for separating oil, hydrocarbon, and non-polar organic contaminants from water may use porous supporting architectures. A "porous supporting architecture" incorporates a chemical support in the composition, including, but not limited to, carbon nanotubes, carbon nanofibers, metal nanoparticles, nanodiamonds, and architectures used to support molecules having a hydrophobicity. The exterior surfaces (or the faces) of these porous supporting architectures are generally modified to provide super-selective wettable materials that may be classified as superhydrophobic or superhydrophilic materials.

In one or more embodiments, the alkylamine modified graphene is not coupled to or impregnated onto a porous supporting architecture. That is, the composition is without a porous supporting architecture.

The alkylamine functional groups on alkylamine modified graphene are of hydrophobic nature and have improved affinity toward non-polar molecules compared to alkylamine functional groups of a less hydrophobic nature. So, separation is controlled by the structure of the alkylamine modified graphene molecules rather than by a modified porous supporting architecture.

A superhydrophilic material allows the absorption or passage of water through it. preventing absorption or passage of oil, hydrocarbon, or non-polar solvents. Hydrophilic surfaces are defined as having a water contact angle less than 90°.

A superhydrophobic material prevents water from passing through it, while allowing non-polar molecules to readily pass through or to be absorbed by the material. Hydrophobic surfaces are defined as having a water contact angle greater than 90°.

Composition

In one or more embodiments, the composition is an alkylamine modified graphene, which is a synthetic absorbent material. The alkylamine modified graphene is in the form of nanosheets. The alkylamine modified graphene includes a graphene core and an alkylamine functional group, to be described.

The general formula for and definition of "alkylamine modified graphene" is $R[-CH_2-(alkylamine)]_x$, where R is graphene, where $CH_2$ is a methylene carbon, and where x is an amount of alkylamine functional group.

Figure 2:
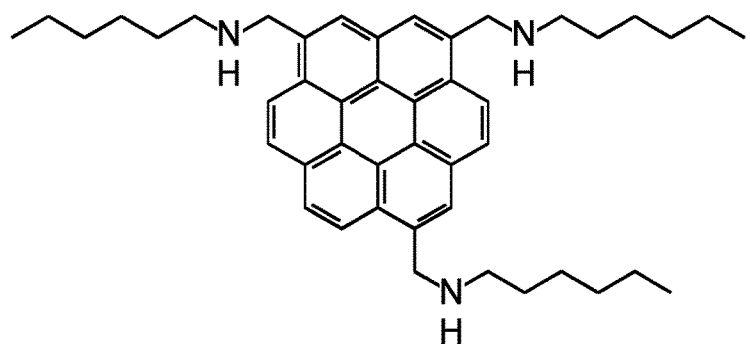
FIG. 2 shows a representation of a graphene modified with n-hexylamine (GHA), according to one or more embodiments.
Figure 3:
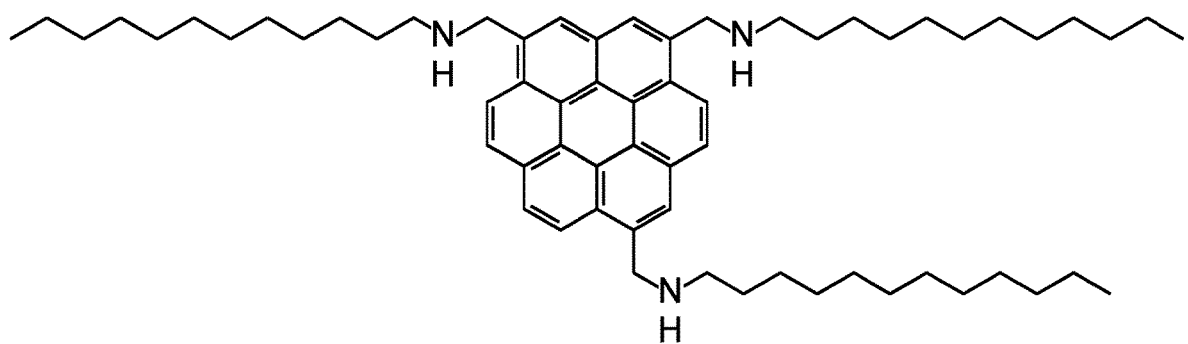
FIG. 3 shows a representation of a graphene modified with n-dodecylamine (GDA), according to one or more embodiments.

In one or more embodiments, x is a non-zero integer. In another one or more embodiments, x is in a range of from 1 to 12, such as from 1 to 11, from 1 to 10, from 2 to 12, from 2 to 11, from 2 to 10, from 3 to 12, from 3 to 11, or from 3 to 10. As depicted in FIGS. 1-3, x=3, meaning that there are 3 "[—$CH_2$-(alkylamine)]" functional groups in these depictions.

An "alkylamine functional group" is a functional group that has the formula "[—$CH_2$-(alkylamine)]." The "alkylamine" is a saturated n-alkyl-amine of 3 to 12 carbons in length. For example, the alkylamine may be of 3, 4, 5, 6, 7, 8, 9, 10, 11 or 12 carbons in length. The alkylamine functional group may include, but is not limited to, one or more selected from the group consisting of [—$CH_2$-(n-propylamine)], [—$CH_2$-(n-hexylamine)], and [—$CH_2$-(n-dodecylamine)]. It is envisioned that different types of alkylamine functional groups of one or more embodiments may be included on a single graphene core.

The alkylamine functional group formula "[—$CH_2$-(n-propylamine)]" may be expressed as "[—$CH_2$—NH—$(CH_2)_2CH_3$]."

The alkylamine functional group formula "[—$CH_2$-(n-hexylamine)]" may be expressed as "[—$CH_2$—NH—$(CH_2)_5CH_3$]."

The alkylamine functional group formula "[—$CH_2$-(n-dodecylamine)]" may be expressed as "[—$CH_2$—NH—$(CH_2)_{11}CH_3$]."

As depicted in embodiment FIGS. 1-3, the alkylamine functional groups are attached to different carbons on the graphene core. However, in one or more embodiments the alkylamine functional groups may be attached to the same carbon on the graphene core.

The alkylamine functional group is bound to an outer carbon of the graphene core. Thus, these alkylamine functional groups are concentrated on the edges and corners of the graphene core. In this instance, the edges and corners of the molecules include the outer rings and atoms of the graphene nanosheet.

An outer carbon of the graphene core is not limited to a location on an outer ring (as shown in FIGS. 1-3) and may include another suitable outer carbon that is not on a ring (such as a ring that has been broken, or an incomplete ring). The carbon-carbon bond between the graphene core and the alkylamine functional group may extend from an $SP_2$ hybridized carbon (as shown in FIGS. 1-3) or it may extend from an $SP_3$ hybridized carbon.

Three variations of the alkylamine modified graphene are as follows.

The alkylamine modified graphene may include $R[-CH_2-(n-propylamine)]_x$, called "GPA," where R and x are previously described and where an embodiment thereof is shown in FIG. 1.

The alkylamine modified graphene may include $R[-CH_2-(n-hexylamine)]_x$, called "GHA," where R and x are previously described and where an embodiment thereof is shown in FIG. 2.

The alkylamine modified graphene may include $R[-CH_2-(n-dodecylamine)]_x$, called "GDA," where R and x are previously described and where an embodiment thereof is shown in FIG. 3.

The weight ratio of alkylamine functional group to graphene core may be in a range of from about 20:1 to 30:1 in the alkylamine modified graphene, such as 21:1 to 30:1, 22:1 to 30:1, 23:1 to 30:1, 20:1 to 29:1, 21:1 to 29:1, 22:1 to 29:1, 23:1 to 29:1, 20:1 to 28:1, 21:1 to 28:1, 22:1 to 28:1, 23:1 to 28:1, 20:1 to 27:1, 21:1 to 27:1, 22:1 to 27:1, 23:1 to 27:1, 20:1 to 26:1, 21:1 to 26:1, 22:1 to 26:1, 23:1 to 26:1, 20:1 to 25:1, 21:1 to 25:1, 22:1 to 25:1, or 23:1 to 25:1. This weight ratio of alkylamine functional group to graphene core increases hydrophobicity of the alkylamine modified graphene, thereby contributing to absorption capacity properties.

The absorption capacity of the alkylamine modified graphene may be stable at conditions such as batch or dynamic mode (to treat water with flow rate), where stable means that the absorption capacity remains within the specified range.

In one or more embodiments, the graphene core is a reduced graphene oxide (rGO). Generally, graphene oxide (GO) may include epoxides, alcohols, and other oxygenated functional groups, whereas rGO may include an absence of select bonds such as single or double bonds, carbon to carbon bonds, and carbon to oxygen bonds on the graphene rings. Thus, the structure of the functionalized and reduced graphene core (rGO) in alkylamine modified graphene may vary slightly from FIGS. 1-3, to be described.

In one or more embodiments, a nitrogen functional group is coupled to the graphene core in trace amounts.

The phrases "trace" or "trace amounts" represent a quantity that is 100 parts per thousand or less.

Thus, in addition to an alkylamine functional group, the composition may include one or more nitrogen functional group, including, but not limited to, amides, amines, and alkylammonium salts. Such nitrogen functional groups may be present from an addition or reduction process.

In one or more embodiments, an oxygen functional group is coupled to the graphene core in trace amounts.

Thus, the alkylamine modified graphene may include one or more oxygen functional group, including but not limited to, oxides; alcohols; diols, such as vicinal diols; carbonyls; amides; epoxides; acids; other oxygen-containing functional group; or other oxidized functional group. Such oxygen functional groups may be present from an incomplete reduction process.

Trace amounts of an oxygen functional group on the alkylamine modified graphene may provide a contact angle greater than 150° (contact angle with water). This contact angle corresponds with the contact angle of a superhydrophobic material. Where an oxygen functional group on the alkylamine modified graphene is absent, a zero amount, then the contact angle may be greater than 160°.

The alkylamine modified graphene may have broken bonds from those shown in the figures. Such broken bonds may arise from a reduction process. Examples of these broken bonds include, but are not limited to, broken single, double, or aromatic bonds on a graphene (or a reduced graphene oxide) ring. For example, there may be one or more partial ring saturations on the alkylamine modified graphene. The broken bonds may be present on the corners or edges of the alkylamine modified graphene. The broken bonds may be present in reduced amounts on the faces of the alkylamine modified graphene compared to the corners or edges. In this instance, the faces of the alkylamine modified graphene (front face and back face) include bonds that are not on the corners or edges of the graphene core.

As previously described, the alkylamine modified graphene is a graphene nanosheet. A "nanosheet" is an individual molecule of alkylamine modified graphene. The nanosheet has a length, a width, and a height. The 'nano' dimension is measured along the height of the molecule from a front face to a back face. The height of the molecule ranges from about 7 to 30 nanometers (nm), such as from 8 to 30 nm, 9 to 28 nm, 10 to 26 nm, and 12 to 24 nm. The length of the nanosheet is in the range of about 2 to 20 micrometers (μm), such as 3 to 20 μm, 4 to 20 μm, or 5 to 20 μm. The width of the nanosheet is in the range of about 2 to 20 micrometers (μm), such as 3 to 20 μm, 4 to 20 μm, or 5 to 20 μm. The shape of the nanosheet is not particularly limited and may include an overall rectangle shape, a square shape, or other geometric shape. This 2 to 20 μm length and width range of nanosheet is considered longer (or larger) than nanosheets of a smaller size range, even though a smaller size range may overlap a portion of the 2 to 20 μm range.

Longer (or larger) nanosheets may be stable mechanically and thermally, while providing good separation efficiency, as compared to nanosheets of a smaller size range. For example, the alkylamine modified graphene nanosheets of one or more embodiments provide separation efficiency of 75% or greater, such as 80% or greater, 85% or greater, 90% or greater, or 95% or greater.

When graphene is not functionalized according to one or more embodiments, the graphene (GO or rGO) may provide insufficient separation efficiency, such as separation efficiency less 75%, less than 70%, less than 65%, less than 60%, less than 55%, or less than 50%.

The alkylamine modified graphene contact angle is between about 135° to 170°, such as between 135° to 165°, 140° to 165, 145° to 165°, 150° to 168°, 150° to 165°, 151° to 170°, 151° to 165°, 152° to 170°, 152° to 165°, or 152 to 163°. GPA has a contact angle within a range of from about 140° to 150°, such as 141° to 150°, 142 to 150°, 143° to 150°, 144° to 150°, or 145° to 150°. GHA has a contact angle within a range of from about 145° to 155°, such as 146° to 155°, 147° to 155°, 148° to 155°, 149° to 155°, or 150° to 155°. GDA has a contact angle within a range of from about 155° to 170°, such as 156° to 170°, 157° to 170, 158° to 170°, 159° to 170°, 160° to 170°, 160° to 169°, 160° to 168°, 160° to 167°, 160° to 166°, or 160° to 165°.

The contact angle of the alkylamine modified graphene demonstrates that the molecules are hydrophobic. This further indicates that an oxygen containing group is present in trace amounts on the alkylamine modified graphene.

In general, the composition does not include any sponge material, such as melamine sponge. The composition does not include carbonized foam material. Such carbonized foam material may be polymerized foam that forms a hydrophobic oleophilic material. Further, the composition does not include carbon nanotubes.

Advantageously, the alkylamine modified graphene provides a water rejection in the range of about 95% or more, such as 96% or more, 97% or more, 98% or more, 99% or more. In one or more embodiments, the alkylamine modified graphene provides a water rejection of 100%.

Process to Prepare Composition

Graphene oxide (GO) is prepared from graphite by a modified Hummer's method. Alkylamine is added to react with the carboxylic acids on the graphene oxide to form amides. The resultant alkylamide functionalized GO is then reduced. The reduction simultaneously reduces amides to amines while removing a substantial amount of oxygen atoms from the alkylamide functionalized GO to form an alkylamine functionalized rGO, the alkylamine modified graphene. A "substantial amount of oxygen atoms" in this instance is an amount of oxygen atoms that results in trace amounts of oxygen functional groups on the alkylamine modified graphene.

System

Figure 4:
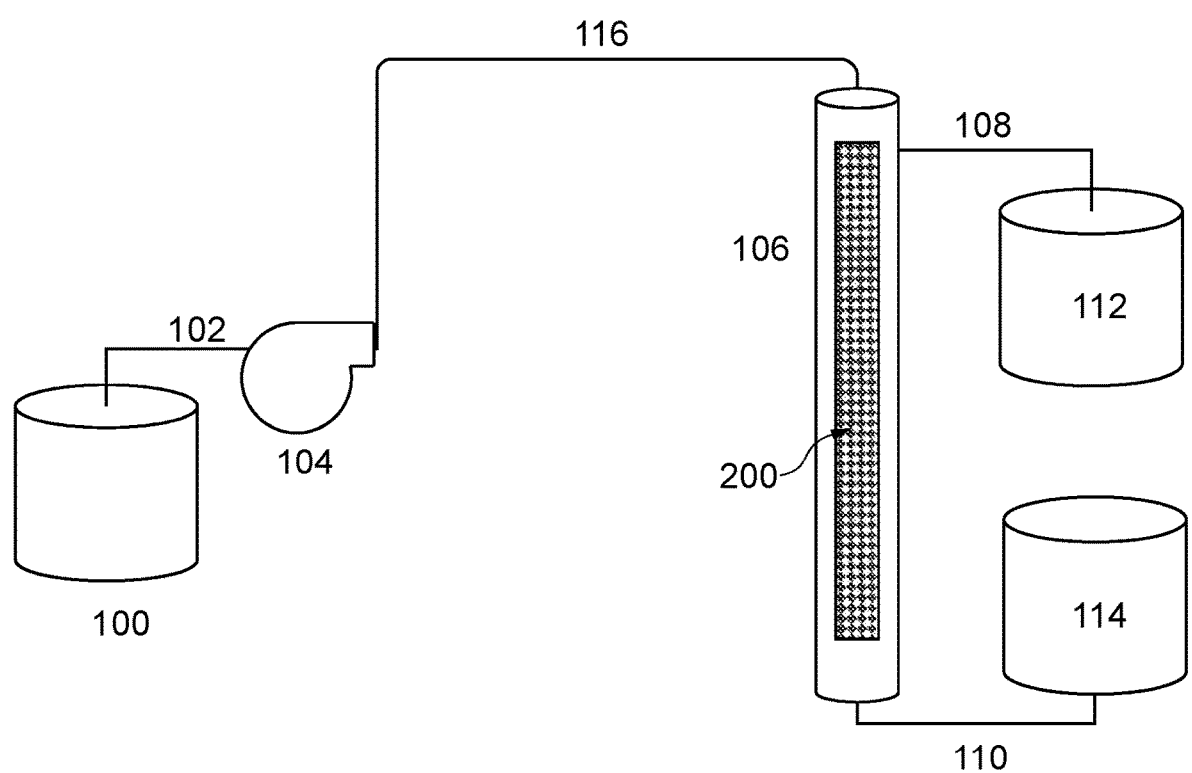
FIG. 4 shows a representation of a filtration system, according to one or more embodiments.

The filtration system of one or more embodiments is shown in FIG. 4. A mechanical filtering system is envisioned. The system includes an input tube 102 (configured to allow flow of oil, hydrocarbons, non-polar solvents, and water mixtures) and an output hydrocarbon tube 110 (configured to allow flow of oil, hydrocarbons, and non-polar solvents), as well as an output aqueous tube 108 (configured to allow flow of water, polar solvents, and mixtures thereof). Between the input and output tubes are various parts of the system that work together that are configured to separate hydrocarbon from a fluid comprising a hydrocarbon and water.

The system includes a holding tank 100 configured to contain an amount of fluid comprising hydrocarbon and water. For example, the holding tank may house a hydrocarbon and water combination to be separated. The holding tank may be a physical tank. When a physical tank is not provided, the holding tank may be an input from another source of fluid comprising hydrocarbon and water that feeds the input tube 102. In this instance, the fluid comprising hydrocarbon and water may be an immiscible mixture. In other instances, the fluid comprising hydrocarbon and water may be a moderately or fully miscible mixture.

The system includes a pump 104 that is configured to control flow rate. The pump is downstream of the holding tank and upstream of a membrane housing 106. A suitable pump is one with a controlled flow rate, including, but not limited to, a peristaltic pump. A suitable pump may be a static or variable pressure or volume pump, with an ability to control flow rate. The pump may have a revolution per minute (rpm) range of from about 1 rpm to 400 rpm. The flow rate is dependent on other factors, such as the diameter of the tubing (or for a pump other than a peristaltic pump, the volumetric size of the pump).

In one or more embodiments, a pressurized tube 116 is included between the pump and the membrane housing. In one or more embodiments, the pump is coupled directly to the membrane housing.

As mentioned, the system includes a membrane housing 106 packed with filtration media 200 that is downstream of the holding tank. The filtration media 200 is the alkylamine modified graphene of one or more embodiments. The filtration media may be one type of alkylamine modified graphene, or multiple types of alkylamine modified graphene in combination.

The membrane housing 106 includes two or more membranes. The filtration media is packed (or is present) between two or more membranes within the membrane housing 106. The two or more membranes are positioned within the membrane housing to prevent loss of filtration media. For example, one membrane may be positioned between the pressurized tube 116 and the filtration media 200. Another membrane may be positioned between the filtration media 200 and the output aqueous tube 108. Further, another membrane may be positioned between the filtration media 200 and the output hydrocarbon tube 110. The amount of membranes is not particularly limited and may include, but is not limited to, two membranes, three membranes, four membranes, or more than four membranes. Where more than two membranes are included, multiple membranes may be layered together without filtration media between or they may be separated with filtration media between them. The membranes are permeable to hydrocarbons and water but impermeable to the filtration media. The membranes may be made of a polysulfone material.

As previously mentioned, the system includes tubing to couple the parts of the system. Such tubing may couple the holding tank and the pump (input tube 102). Tubing may couple the pump and the membrane housing and is configured to provide pressurized flow of hydrocarbon and water (pressurized tube 116). Tubing may couple the membrane housing to a collection tank. The amount of output tubes is not particularly limited and may include 2 or more output tubes. In one or more embodiments, an output aqueous tube 108 couples the membrane housing and a water collection tank 112 and is configured to provide flow of decontaminated water. In one or more embodiments, an output hydrocarbon tube couples the membrane housing and a hydrocarbon collection tank 114 and is configured to provide flow of separated hydrocarbon. The tubing may withstand pressures of from 0.1 to 50 Pascal.

The system may include one or more collection tank. The one or more collection tank may include one or more water collection tank 112. The one or more collection tank may include one or more hydrocarbon collection tank 114. When a physical tank is not included, the collection tank may be an outlet, such as a hydrocarbon outlet and a water outlet. A combination of an outlet with one type of collection tank is envisioned. For example, the system may include a hydrocarbon outlet and a water collection tank. In another example, the system may include a water outlet and a hydrocarbon collection tank. A combination of multiple outlets without a collection tank is also envisioned.

In general, the system removes oil, such as crude oil or other non-polar solvents or hydrocarbons, from an emulsified or contaminated water stream. The system is designed to recover decontaminated water or recovers decontaminated water. A hydrocarbon-contaminated water enters the system at the holding tank 100 and is pulled through the input tube 102 via the pump 104, which allows the hydrocarbon-contaminated water to flow into the membrane housing 106. The filtration media 200 is superhydrophobic and hydrocarbon-absorbent. The filtration media within the filtration device absorbs oil, hydrocarbon, and non-polar solvent, while repelling water out of the filtration device via output aqueous tube 108 into the water collection tank 112. When the filtration media is saturated with absorbed hydrocarbon, it is called hydrocarbon-absorbed alkylamine modified graphene. The oil, hydrocarbon, or non-polar solvent is pushed out of the filtration media and membrane housing via output hydrocarbon tube 110 and into the hydrocarbon collection tank 114.

Methods

In one or more embodiments, a method is provided that includes introducing the composition, alkylamine modified graphene, as a filtration media into a hydrocarbon contaminated water. In another one or more embodiments, a method is provided that includes introducing a hydrocarbon contaminated water into alkylamine modified graphene, as a filtration media. Prior to use, the alkylamine modified graphene is a solid, such as a powder.

The method includes absorbing hydrocarbon from the hydrocarbon-contaminated water using the filtration media (alkylamine modified graphene). In one or more embodiments, the step of absorbing hydrocarbon includes absorbing a mass of hydrocarbon that is in a range of from about 25 to 65 times the weight of the filtration media (with 95% or more water rejection, such as up to 100% water rejection).

The method includes creating a hydrocarbon-absorbed filtration media (alkylamine modified graphene) and recovered water.

The method includes separating of an oil phase and a water phase, where the oil phase includes the hydrocarbon-absorbed filtration media (oil, hydrocarbon, non-polar solvents and alkylamine modified graphene) and the water phase includes recovered water.

In one or more embodiments, the method includes recovering the separated oil phase from the water phase.

In one or more embodiments, the method includes further recovering the separated oil phase from the hydrocarbon-absorbed alkylamine modified graphene.

In one or more embodiments, 75% or more of the hydrocarbon from the hydrocarbon-absorbed alkylamine modified graphene is recovered. For example, 80% or more, 85% or more, 90% or more, 95% or more, or 99% or more of the hydrocarbon from the hydrocarbon-absorbed alkylamine modified graphene may be recovered.

In one or more embodiments, about 95% or more of the water in the hydrocarbon-contaminated water is recovered. For example, 95% or more, 96% or more, 97% or more, 98% or more, 99% or more, or 100% of the water in the hydrocarbon-contaminated water is recovered in the recovered water.

In one or more embodiments, the method does not include forming of an emulsion to collect hydrocarbon, as this may affect and reduce the performance of the alkylamine modified graphene for absorbing hydrocarbon compared to when no emulsion is formed. In some instances, however, hydrocarbon-contaminated water includes, in part, an emulsion of oil and water. In such instances, it is envisioned that oil absorption into alkylamine modified graphene proceeds as designed.

In one or more embodiments, a sponge material is not used to absorb oil, hydrocarbon, or non-polar solvent.

The method is a treatment method for oil and water combination or oil- or hydrocarbon-contaminated water. The method may be used as a secondary or tertiary step to improve separation of oil and water. For example, the method may be used downstream of a bottom or tops skimmer from a chemical plant. The method may ensure removal of hydrocarbons (from water) that flow through and are not skimmed off the top or separated from the bottoms. The method may further treat wastewater from a water treatment facility, for example, where microbes have not broken down the hydrocarbons.

A method of treatment involving produced water recovers the oil that was previously trapped in produced water. When treating produced water with the method of one or more embodiments, oil that is trapped in the produced water is not re-injected back into the well, such as in traditional injection or disposal wells. The method of treatment involving produced water may be used for flooding and fracturing applications. This method of treatment may reduce oil concentration in produced water compared to without the method, thereby avoiding and preventing damage to the well formation.

A method of treatment involving a gas oil separation plant (GOSP) may reduce chemical injections in the treatment process by removing oil and hydrocarbons from the water.

System Method

In one or more embodiments, a low flow rate (at lab scale, or small scale, this is about 1 to 500 milliliters per minute (mL/min)) of hydrocarbon-contaminated water is provided to condition the filtration device. After conditioning, the flow rate is increased with the pump. The outlets are then opened to collect the separated hydrocarbon in the hydrocarbon collection tank and the rejected water in the water collection tank.

EXAMPLES

The examples include absorption capacity, oil absorption, and separation efficiency tests using the composition and method of one or more embodiments.

Materials

The materials used are as follows. The natural graphite powder (99.9%) was commercially purchased from Fluka™ AG, Chemische Fabrik, Buchs (Switzerland). Sulphuric acid (98%), hydrochloric acid (35%), sodium nitrate (98%), hydrogen peroxide (30%), hydrazine hydrate (80%), and potassium permanganate (99%) were obtained from Sigma-Aldrich Co. (USA) and were used without further purification. n-propylamine (PA), n-hexylamine (HA), and n-dodecylamine (DA) were purchased from Merck Schuchardt OHG (Germany) and were used as received. Cyclohexane, n-hexane, n-decane, n-heptane, and ethanol (99.8% purity) were supplied by Sigma-Aldrich Co. (USA) and used as received. Deionized water (DI) was used throughout as a water source.

Synthesis of Alkylamine Modified Graphene

The synthesis of graphene oxide precursor is as follows. Graphene oxide (GO) nanosheets were prepared by a modified Hummer's method. Graphite powder (2 grams (g)) and sodium nitrate (2 g) were added to 90 milliliters (mL) of sulfuric acid (98%, mass fraction) and stirred for 4 hours (h) at 0-5° C. under atmospheric conditions. Potassium permanganate (12 g) was added, keeping the temperature below 15° C. 184 mL of water was added, and the mixture was stirred for 2 hours. The ice bath was removed, and the mixture stirred for 2 hours at 35° C. Next, the mixture was refluxed at 98° C. for 10-15 min. The temperature was reduced to 30° C., which gave a brown colored solution. The solution was treated with 40 mL hydrogen peroxide while the solution changed to a yellow color. 200 mL of water was added and stirred for 1 hour followed by sitting without stirring for 3-4 hours, where particles settled at the bottom. The resulting mixture was neutralized, which included filtering and washing by centrifugation (7000 revolutions per minute for 15 minutes) with 10% HCl followed by DI water until it formed gel-like substance with neutral pH. The supernatant was decanted, and the gel-like substance was dried under vacuum at 60° C. to obtain graphene oxide (GO) nanosheets in powder form.

The synthesis of alkylamine modified graphene is as follows. The as-synthesized GO nanosheets in powder form were dispersed in DI water (0.5 g GO/100 mL DI water) and the resulting suspension was sonicated for 1 hour. Alkylamine (about 12 g) was dissolved in 200 mL ethanol, and the GO water suspension was added to the alkylamine-ethanol solution. 1.0 g of GO was added to about 0.1 to 0.5 moles alkylamine. 1.0 g of GO to about 0.05 to 4 moles of alkylamine may be used in some scenarios. The mixture was stirred for a day at room temperature to create the alkylamine modified graphene oxide, which was separated out by centrifuge. This synthetic step relies on amidation between alkylamine and carboxy groups. Weight ratio of alkylamine to graphene is 24:1 in the solution and in the final alkylamine modified graphene. Reduction of alkylamine-functionalized graphene oxide proceeded by adding 5 mL hydrazine hydrate, and the mixture was refluxed for 3 hours at 95° C. The resultant alkylamine modified graphene was washed by filtration with ethanol-water mixture (1:1) to eliminate unreacted hydrazine hydrate or excess alkyl amine. The material was dried under vacuum at 60° C. for a day or more. The resulting solid was vacuum dried at 60° C. for 24 hours or more. This procedure was used to synthesize GPA, GHA, and GDA.

The synthesis does not include octylamine, dodecylamine, and hexadecylamine. The synthesis does not rely on interaction between a potential epoxy group on GO and an alkylamine. The synthesis does not include microwave assisted thermal expansion. No surface protection procedure, such as addition of wax, is applied that may coat a particle prior to its modification. The synthesis does not include thionyl chloride before addition of alkylamine. That is, halogenated functional groups are not present on the alkylamine modified graphene. Other various forms of carboxylic acid activation are not envisioned, such as Lewis acid activation, anhydride activation, or other forms of activation. Graphene oxide is not refluxed with an organic solvent of alkylamine at a high temperature. "High temperature," such as 300° C. or greater, may affect the stability of (break down) the alkylamine modified graphene, and are avoided.

Analysis of Alkylamine Modified Graphene

FTIR spectra of the materials were obtained using Thermo Nicolet™ 6700 FTIR spectrophotometer. Potassium bromide (KBr) was ground with the sample to prepare the pellet for better resolution of the peaks. The samples were scanned in the wavenumber range of 400 to 4000 1/centimeter ($cm^{-1}$).

Figure 5:
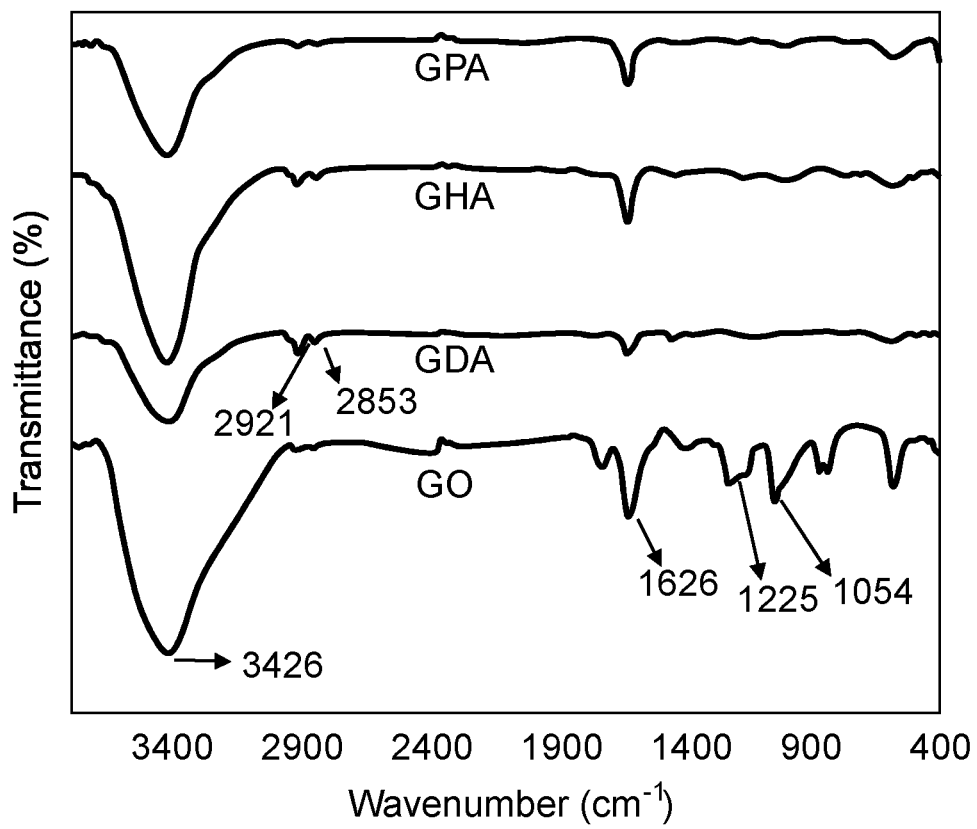
FIG. 5 shows Fourier-transform infrared spectroscopy (FTIR) data of graphene oxide and three types of alkylamine modified graphene, according to one or more embodiments.

FIG. 5 shows FTIR data of GO, as compared to the alkylamine modified graphene: GPA, GHA, and GDA.

One difference between the GPA, GHA, and GDA spectra and the FTIR spectra relative to that of GO is the disappearance of the bands corresponding to some oxygen-containing functionalities (such as the OH stretch at a wavenumber of 3426 1/centimeter ($cm^{-1}$), C=O stretch at 1724 $cm^{-1}$, and C—O stretch at 1225 and 1054 $cm^{-1}$). This may be attributed to the presence of alkylamine-terminated organic groups (alkylamine functional groups) in the alkylamine modified graphene. Such covalent linkages may reduce the FTIR stretch of functional moieties previously present on GO (for example, COOH) at the edges of the graphene sheets, through amide bonding and subsequent amide reduction to amine. Also, the loss of oxygen functional peaks is indicative of the reduction of the modified graphene oxide by hydrazine hydrate. This chemical reduction further exposes more aromatic islands or pi systems at the basal plane compared to the GO. Such lack of oxide and other oxygen functional groups is indicated by the aforementioned absence of oxygenated bonds in the FTIR and the presence of C=C bonds at the basal plane, which can be confirmed from the C=C stretching at ~1630 $cm^{-1}$. In addition, the bands at 3435 $cm^{-1}$ with symmetric peak shape are indicative of the N—H stretching on GDA, GHA, and GPA. The doublet at 2921 $cm^{-1}$ may correspond to the asymmetric C—H vibrations of the alkyl groups. The doublet at 2853 $cm^{-1}$ may correspond to the symmetric C—H vibrations of the alkyl groups.

Figure 6:
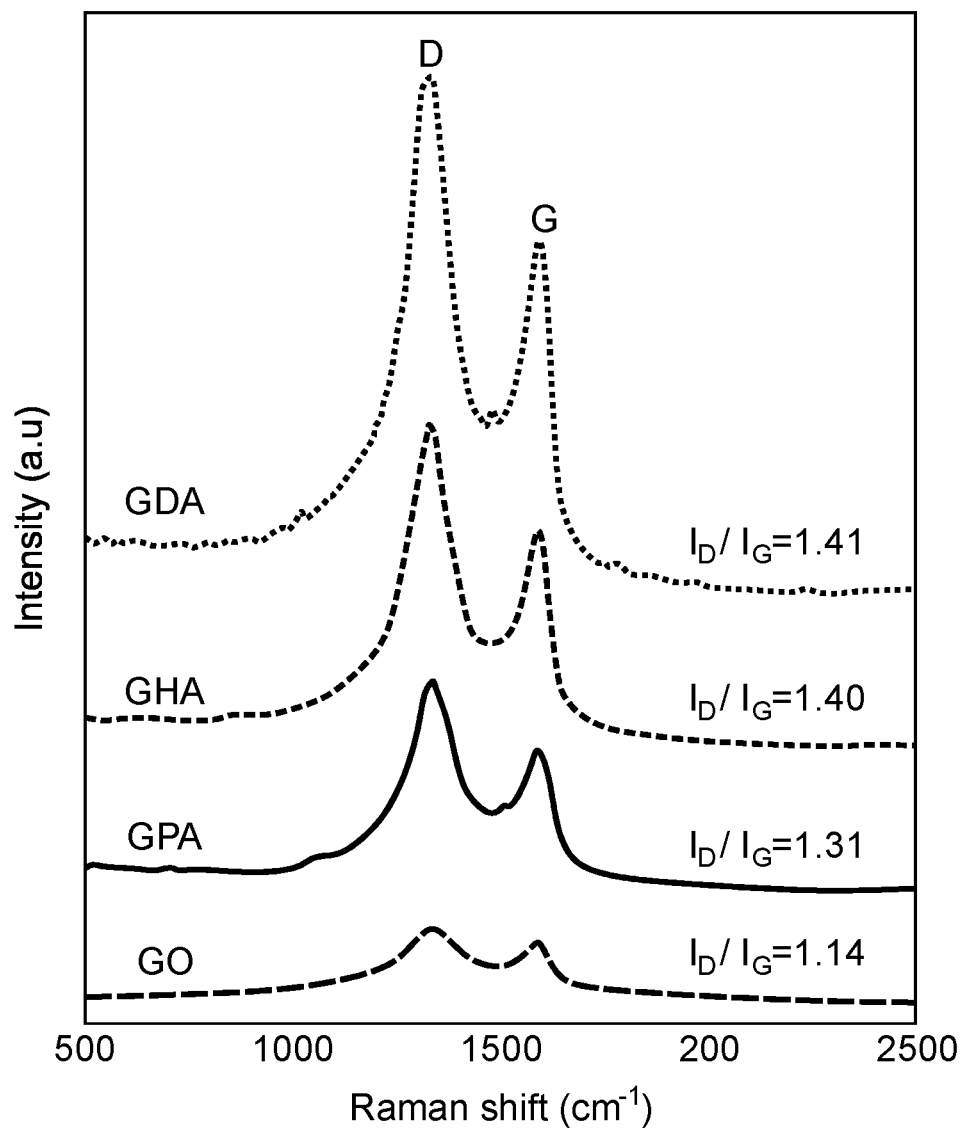
FIG. 6 shows Raman spectra of graphene oxide and three types of alkylamine modified graphene, according to one or more embodiments.

FIG. 6 shows Raman spectra of GO as compared to the alkylamine modified graphene: GPA, GHA, and GDA, at a 633 nanometer (nm) laser excitation.

Raman spectra were obtained using a HORIBA LabRAM spectrometer (HORIBA Jobin Yvon Raman Division) with backscattered confocal configuration. A long working distance objective with a magnification of 50 times was used both to collect the scattered light and to focus the laser beam on the sample surface Samples were scanned from Raman shift of 700 to 2000 $cm^{-1}$.

Raman spectroscopy identification provides an overview of the particle morphology of carbon-based materials. There are at least two prominent bands for such materials, such as the D and G bands, as shown in FIG. 6.

The G band, which peaks at 1587 $cm^{-1}$ in FIG. 6, corresponds to a primary in-plane vibrational mode of $sp^2$ hybridized carbon atoms, such as those present in rings and chains, or having pi orbital systems.

The disorder band (D band), which peaks at 1331 $cm^{-1}$ in FIG. 6, is indicative of a different in-plane vibration (compared to the G band), which can be described as the structural disorder caused by the $sp^3$ hybridized carbon atoms. Such $sp^3$ hybridized carbons include those covalently bonded to other functionalities in the alkylamine modified graphene.

The ratio of the peak intensity of D to G bands ($I_D/I_G$) is used to evaluate the extent of disorder in graphene-based materials. A more intense D band compared to a G band indicates more broken ordered graphene $sp^2$ bonds as compared to unmodified GO (or non-functionalized rGO), and more newly formed $sp^3$ bonds as compared to unmodified GO (or non-functionalized rGO), resulting in more elastic scattering. The peak intensity ratio ($I_D/I_G$), of GDA ($I_D/I_G$=1.41), GHA ($I_D/I_G$=1.40) and GPA ($I_D/I_G$=1.31) increased compared to that of GO ($I_D/I_G$=1.14). This fractional increase in peak intensity ratio demonstrates that new defects are present in GDA, GHA, and GPA as compared to GO.

The contact angles of the alkylamine modified graphene was measured using a Biolin Scientific Attension Theta Flex optical tensiometer.

The contact angle for GPA was measured to be within a range of from about 140° to 149°. The contact angle for GHA was measured as 152°. The contact angle for GDA was measured as 163°.

Example 1

Absorption Capacity Tests

Experiments were carried out to assess the quantitative oil absorption performance of the alkylamine modified graphene. In typical absorption capacity measurements, oil and common organic solvents including decane, cyclohexane, and hexane were selected as models. In these tests, GPA, GHA, and GDA were placed in separate beakers containing the respective oil or organic solvent to be absorbed. The alkylamine modified graphene was submerged under 10 mL of the absorbate and pressed in the liquid for oil absorption. The material was then taken out and compressed manually with the aid of a quick-grip clamp.

Mass (weight) measurements before and after oil absorption were taken to evaluate the absorption capacity of the prepared materials for oil and three different organic solvents (hydrocarbons). The original weight of the sample was weighed and recorded as $M_i$. Then, the sample was placed into the oil or organic solvent for absorption. The sample was weighed when, with the increase of absorption time, its weight was unchanged. This weight was recorded as $M_t$. The absorption capacity of materials (Q) for oil and various organic solvents was calculated according to the equation $$Q\left(\frac{g}{g}\right) = \frac{M_t - M_i}{M_i},$$

where $M_t$ is the weight of the material after absorption of oil or organic solvents in time t and $M_i$ is the weight of the dry material.

Figure 7:
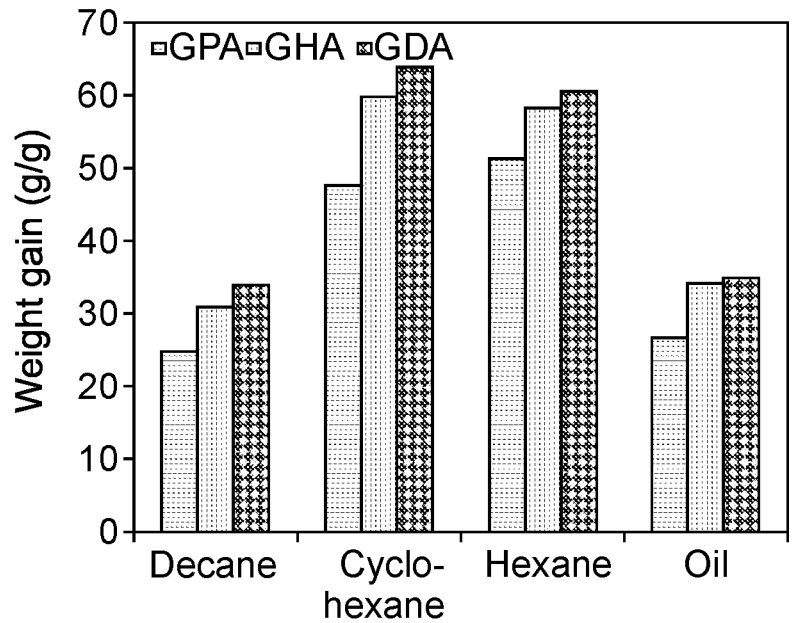
FIG. 7 shows the absorption capacities of alkylamine modified graphene with oil and hydrocarbon solvents.

The absorption capacities, "Q" (gram/gram (g/g)), of the alkylamine modified graphene in both oil and organic liquid media (non-polar hydrocarbon solvents) are shown in in Table 1 and FIG. 7.

TABLE 1

Absorption capacities of alkylamine modified graphene.

Weight gain (gram per gram)

GPA

| | |
|---|---|
| Decane | 26 g/g |
| Cyclohexane | 47 g/g |
| Hexane | 53 g/g |
| Oil | 28 g/g |

GHA

| | |
|---|---|
| Decane | 32 g/g |
| Cyclohexane | 60 g/g |
| Hexane | 58 g/g |
| Oil | 35 g/g |

GDA

| | |
|---|---|
| Decane | 34 g/g |
| Cyclohexane | 64 g/g |
| Hexane | 60 g/g |
| Oil | 28 g/g |

As a control test, unmodified graphene oxide (GO, without alkylamine functional groups, and without reduction) provided 50% separation efficiency or less for oil and organic liquid media in the same tests.

GPA displays absorption capacities ranging from 26 to 53 times its own weight for the absorbates used. GHA displays absorption capacities ranging from 32 to 60 times its own weight for the absorbates used. GDA displays absorption capacities ranging from 34 to 64 times its own weight for the absorbates used.

Of the alkylamine modified graphene compounds tested, GDA provided improved absorption capacity compared to GPA and GPA.

Regarding GPA, these absorption capacity results may be due to an increase of GPA hydrophilicity as compared to GHA and GDA, from the existence of more nitrogen atoms per mass.

Of the absorbates tested, cyclohexane and hexane were absorbed more efficiently than decane or oil.

With the alkylamine modified graphene compounds tested, the method is simple and easily scaled up to large batch fabrication (100 times or more compared to the small or lab scale tests in the examples).

These absorption capacities are in a rage of from about 25 to 65 times the weight of the alkylamine modified graphene, based on the density and viscosity of the oil and solvents. Without wanting to be bound by theory, the absorption capacity performance and selectivity of lower molecular weight absorbates may be associated with the structures that result from alkylamine modified graphene particle agglomeration and the superoleophilic and superhydrophobic properties these materials.

Example 2

Oil Absorption Tests

The procedure for the oil absorption tests was performed as follows. The initial weight of the alkylamine modified graphene was measured. The alkylamine modified graphene was then dipped in a mixture 20:2 of dyed water and hydrocarbon for 5-10 minutes until the hydrocarbon was fully adsorbed. The final weight of the alkylamine modified graphene and time of adsorption was noted. Afterward, the alkylamine modified graphene went through a desorption process to separate from the hydrocarbon. The initial weight of the alkylamine modified graphene was measured again, to ensure no hydrocarbon remained. The procedure was repeated with a different hydrocarbon and a fresh sample of alkylamine modified graphene.

Oil absorption tests were performed on GDA, which initially showed improved absorption capacities from Example 1 compared to GPA and GHA. The results of the oil absorption tests performed with GDA are shown in Table 2.

TABLE 2

Oil absorption tests with GDA.

| Entry | Hydrocarbon (HC) | Time of full absorption | Initial weight of material | Wet material weight | Specific Gravity | Actual absorbed HC in mL | Comments |
|---|---|---|---|---|---|---|---|
| 1 | 2 milliliters (mL) hexane | 5 minutes (min) | 0.28 grams (g) | 1.3 g | 0.659 g/mL | 2 mL | Complete absorption of HC |
| 2 | 2 mL heptane | 5 min | 0.28 g | 1.2 g | 0.6838 g/mL | 1.75 mL | Complete absorption of HC |
| 3 | 2 mL octane | 10 min | 0.28 g | 1.14 g | 0.692 g/mL | 1.64 mL | Slightly less HC absorbed |

The alkylamine modified graphene provided high hydrocarbon absorptivity in these tests. "High hydrocarbon absorptivity" means that the material absorbs over 3 times its initial weight of hydrocarbon (light n-alkyl hydrocarbons). "Complete absorption of HC" means 100% separation efficiency (hydrocarbon absorption). "Slightly less HC absorbed" means 99% separation efficiency or more (hydrocarbon absorption).

Example 3

Separation Efficiency Tests

The separation efficiency of alkylamine modified graphene was assessed by measuring the weight percentage of collected oil or solvent in an oil-water or an organic solvent-water mixture (which are examples of hydrocarbon-contaminated water).

Figure 8:
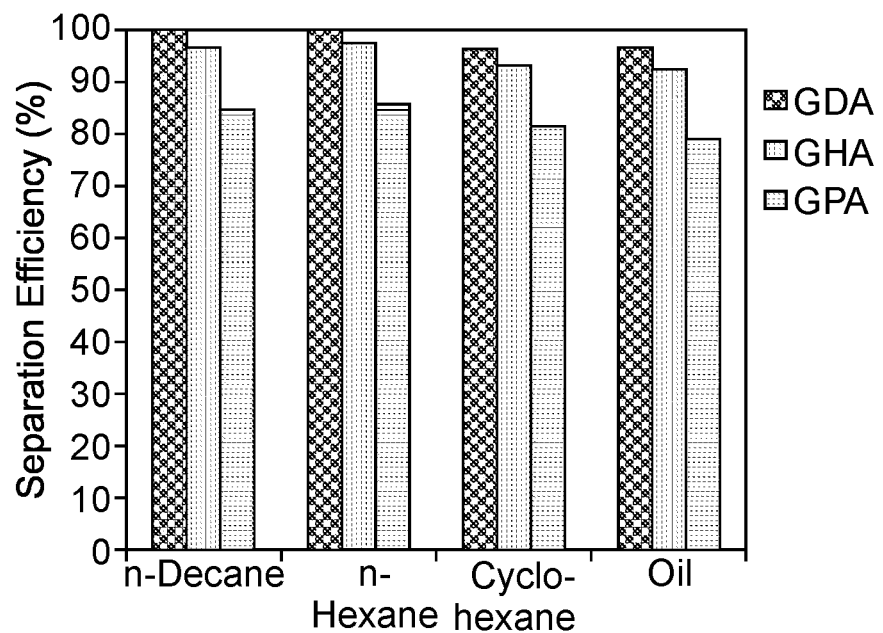
FIG. 8 shows separation efficiency of hydrocarbons from water using alkylamine modified graphene in different types of hydrocarbon and water mixtures.

Methylene blue dye was used as a coloring agent for the water layer, to visually distinguish the water layer from the organic layer. For these tests, fresh samples of GPA, GHA, and GDA were dipped in the respective oil or solvent/water mixture (5 mL:45 mL). As the alkylamine modified graphene powders physically approached the liquid mixtures, they selectively and quickly absorbed the solvent or oil that floated on the surface of the water, leaving behind water in the system. The alkylamine modified graphene (with or without absorbed hydrocarbon) also tended to float on the surface, even when initially immersed by an external force. The results of the separation efficiency tests are shown in Table 3 and FIG. 8.

TABLE 3

Separation efficiencies of alkylamine modified graphene.

|  | Separation Efficiency (%) |
|---|---|
| GPA | |
| n-Decane | 84% |
| n-Hexane | 85% |
| n-Cyclohexane | 82% |
| Oil | 79% |
| GHA | |
| n-Decane | 96% |
| n-Hexane | 97% |
| n-Cyclohexane | 93% |
| Oil | 92% |
| GDA | |
| n-Decane | 100% |
| n-Hexane | 100% |
| n-Cyclohexane | 95% |
| Oil | 96% |

The oil or organic solvent (hydrocarbon) was recovered by a mechanical squeezing process and the respective materials were reused repeatedly with similar separation efficiency. The separation efficiency of the hydrophobic and oleophilic alkylamine modified graphene nanosheets for the organic solvents and oil is 75% or more, such as 79% or more, 92% or more, or 95% or more. The GDA molecules had improved separation efficiency compared to GPA and GHA in these tests.

As previously mentioned, the alkylamine modified graphene instantly absorbed oil or organic solvent once the material was in contact with the oil or organic solvent. This differential affinity to an organic phase shows that the alkylamine modified graphene is oleophilic and hydrophobic. Without being bound by theory, the oil or organic solvent may flow rapidly into the space that exists between individual molecules of alkylamine functionalized graphene. The space existing between individual molecules may result from aggregation of the alkylamine modified graphene molecules.

The collective analytical and test results from the alkylamine modified graphene of one or more embodiments show that these molecules provide superhydrophobic properties. Further, it is shown that alkylamine modified graphene may provide up to 100% water rejection.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it should be understood that another one or more embodiments is from the one particular value to the other particular value, along with all particular values and combinations thereof within the range.

Although a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function and not only structural equivalents, but also equivalent structures. It is the express intention of the applicant not to invoke 35 U.S.C. § 112(f) for any limitations of any of the claims, except for those in which the claim expressly uses the words 'means for' together with an associated function.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and all grammatical variations thereof are each intended to have an open, non-limiting meaning that does not exclude additional elements or steps.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed is:

1. A composition, consisting of:
an alkylamine modified graphene having a formula R[—CH$_2$-(alkylamine)]$_x$ with trace amounts of both an oxygen functional group and a nitrogen functional group coupled to the graphene core,
where R is a graphene core, [—CH$_2$-(alkylamine)] is an alkylamine functional group, and x is a non-zero integer, and
where the alkylamine functional group is one or more selected from the group consisting of [—CH$_2$-(n-propylamine)], [—CH$_2$-(n-hexylamine)], and [—CH$_2$-(n-dodecylamine)], and
where the alkylamine modified graphene has a weight ratio of alkylamine to graphene in a range of from about 20:1 to 30:1.

2. The composition of claim 1, where x is in a range of from 1 to 12.

3. The composition of claim 1, where the alkylamine modified graphene is a nanosheet.

4. The composition of claim 1, where the alkylamine modified graphene has a height in a range of from about 7 to 30 nanometers, a length in a range of from about 2 to 20 micrometers, and a width in a range of from about 2 to 20 micrometers.

5. The composition of claim 1, where the alkylamine modified graphene has a contact angle in a range of from 140° to 170°.

6. The composition of claim 1,
where the oxygen functional group is one or more selected from the group consisting of oxides, alcohols, diols, carbonyls, amides, epoxides, and acids; and
where the nitrogen functional group is one or more selected from the group consisting of amides, amines, and alkylammonium salts.

7. A method to use an alkylamine modified graphene, comprising:
introducing the alkylamine modified graphene into a hydrocarbon-contaminated water such that a hydrocarbon-absorbed alkylamine modified graphene and a recovered water form,
where the hydrocarbon-contaminated water comprises water and a hydrocarbon,
where the alkylamine modified graphene has a formula R[—CH$_2$-(alkylamine)]$_x$, with trace amounts of both an oxygen functional group and a nitrogen functional group coupled to the graphene core,
where R is a graphene core, [—CH$_2$-(alkylamine)] is an alkylamine functional group, and x is a non-zero integer, and
where the alkylamine functional group is one or more selected from the group consisting of [—CH$_2$-(n-propylamine)], [—CH$_2$-(n-hexylamine)], and [—CH$_2$-(n-dodecylamine)],
where the alkylamine modified graphene has a weight ratio of alkylamine to graphene in a range of from about 20:1 to 30:1; and
separating the hydrocarbon-absorbed alkylamine modified graphene from the recovered water,
where the hydrocarbon is associated with the hydrocarbon-absorbed alkylamine modified graphene.

8. The method of claim 7, where the hydrocarbon-absorbed alkylamine modified graphene has a mass that is in a range of from about 25 to 65 times greater than the mass of the introduced alkylamine modified graphene.

9. The method of claim 7, where about 95% or more of the water in the hydrocarbon-contaminated water is recovered in the recovered water.

10. The method of claim 7, further comprising recovering 75% or more of the hydrocarbon from the hydrocarbon-absorbed alkylamine modified graphene.

* * * * *